United States Patent [19]

Koehler et al.

[11] Patent Number: 5,523,183

[45] Date of Patent: Jun. 4, 1996

[54] APPARATUS FOR USE IN A BATTERY

[75] Inventors: Paul C. Koehler; Stephen Geibel, both of Cortland; Ralph B. Di Palma, New Hyde Park, all of N.Y.

[73] Assignee: Pall Corporation, East Hills, N.Y.

[21] Appl. No.: 324,979

[22] Filed: Oct. 18, 1994

Related U.S. Application Data

[63] Continuation of Ser. No. 28,603, Mar. 8, 1993, abandoned, which is a continuation of Ser. No. 733,118, Jul. 19, 1991, abandoned.

[51] Int. Cl.⁶ ................................................... H01M 4/78
[52] U.S. Cl. ..................... 429/235; 429/237; 429/245; 428/550; 428/553
[58] Field of Search ................................ 429/221, 223, 429/235, 237, 245; 428/550, 553

[56] References Cited

U.S. PATENT DOCUMENTS

| | | |
|---|---|---|
| 2,683,181 | 7/1954 | Salauze . |
| 3,507,634 | 4/1970 | O'Driscoll . |
| 3,759,747 | 9/1983 | Schaer . |
| 4,339,473 | 7/1982 | D'Agostino et al. ................ 427/44 |
| 4,562,039 | 12/1985 | Koehler ................................ 419/2 |
| 4,613,369 | 9/1986 | Koehler ................................ 75/246 |
| 4,628,593 | 12/1986 | Fritts et al. ........................ 24/623.1 |

FOREIGN PATENT DOCUMENTS

| | | |
|---|---|---|
| 2130110 | 11/1972 | France . |
| 2438286 | 2/1976 | Germany . |
| 2639881 | 3/1978 | Germany . |
| 1341151 | 12/1973 | United Kingdom . |

OTHER PUBLICATIONS

Fink et al. "Electronics Engineers' Handbook", McGraw-Hill Book Company, 1982. (Month N/A).
Linden, "Handbook Of Batteries And Fuel Cells", McGraw-Hill Book Company, 1984 (Month N/A).
"The Way Things Work", Simon and Schuster, 1967 (Month N/A).
Patent Abstract of Japan; vol. 8, No. 213, (E–269) Sep. 28, 1984, corresponding to JP-A-59 098 463.

*Primary Examiner*—Stephen Kalafut
*Attorney, Agent, or Firm*—Leydig, Voit & Mayer

[57] ABSTRACT

A battery electrode is provided comprising a porous, pleated metal structure, preferably comprising nickel as its substrate.

40 Claims, 2 Drawing Sheets

APPARATUS FOR USE IN A BATTERY

This disclosure is a continuation of U.S. patent application Ser. No. 08/028,603, filed on Mar. 8, 1993, which is a continuation of 07/733,118 filed on Jul. 19, 1991, both now abandoned.

TECHNICAL FIELD

This invention relates to corrugated metal articles and, more particularly, to a porous, pleated metal article useful as a battery electrode.

BACKGROUND ART

Metal electrodes have long been used in a variety of battery applications. Typically, an electrode prepared from a metal should have a high porosity and surface area while maintaining the current-carrying capability of the electrode. Additionally, the electrode should have good dimensional stability when subjected to thermal cycling such as occurs during charge and discharge of the battery. Further, the maximum amount of electrode area should be packed into the smallest volume possible to maximize the high rate charge and discharge capability of rechargeable batteries. This allows down-sizing of conventional battery structures with attendant efficiencies in utilization of space, weight, and the like. Additionally, the electrode should be as uniform in structure as possible to optimize performance. The subject invention is directed to providing an electrode structure with these characteristics.

DISCLOSURE OF THE INVENTION

In accordance with the subject invention, porous, pleated electrode structures are provided which are pleated to provide the desired height, desired rigidity, and good dimensional stability during charge and discharge or temperature cycling.

The pleated electrode structures in accordance with this invention typically have geometric voids volumes of at least about 80 percent, preferably from about 82 to about 90 percent, and surface areas (determined by BET) of at least about 0.02 square meters per gram, more typically in the range of from about 0.025 to about 0.040 square meters per gram. By "geometric voids volume" is meant the voids volume of the envelope of the corrugated electrode structure, including the open space between the pleats. They may be prepared from a metallic foraminate structure, for example, woven wire mesh which has been impregnated with fine nickel powder, sintered, and corrugated to desired dimensions. Alternatively, they may be prepared from randomly-laid metallic particles or fibrils of the desired metal, e.g., nickel, silver, etc., or from, for example, sintered metal fibers which have been impregnated with the desired metal powder and subsequently corrugated to the desired dimensions.

BEST MODE FOR CARRYING OUT THE INVENTION

Figure 1:
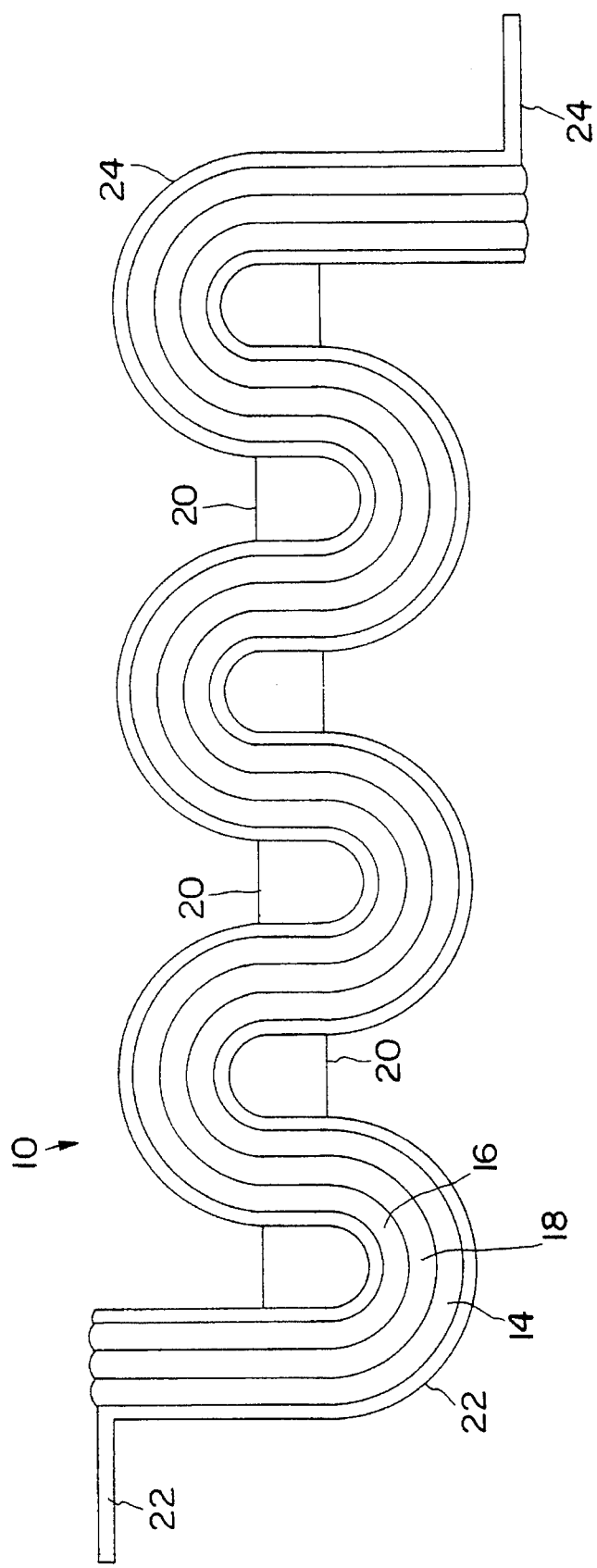
FIG. 1 is a top view of a battery electrode structure according to the invention.
Figure 2:
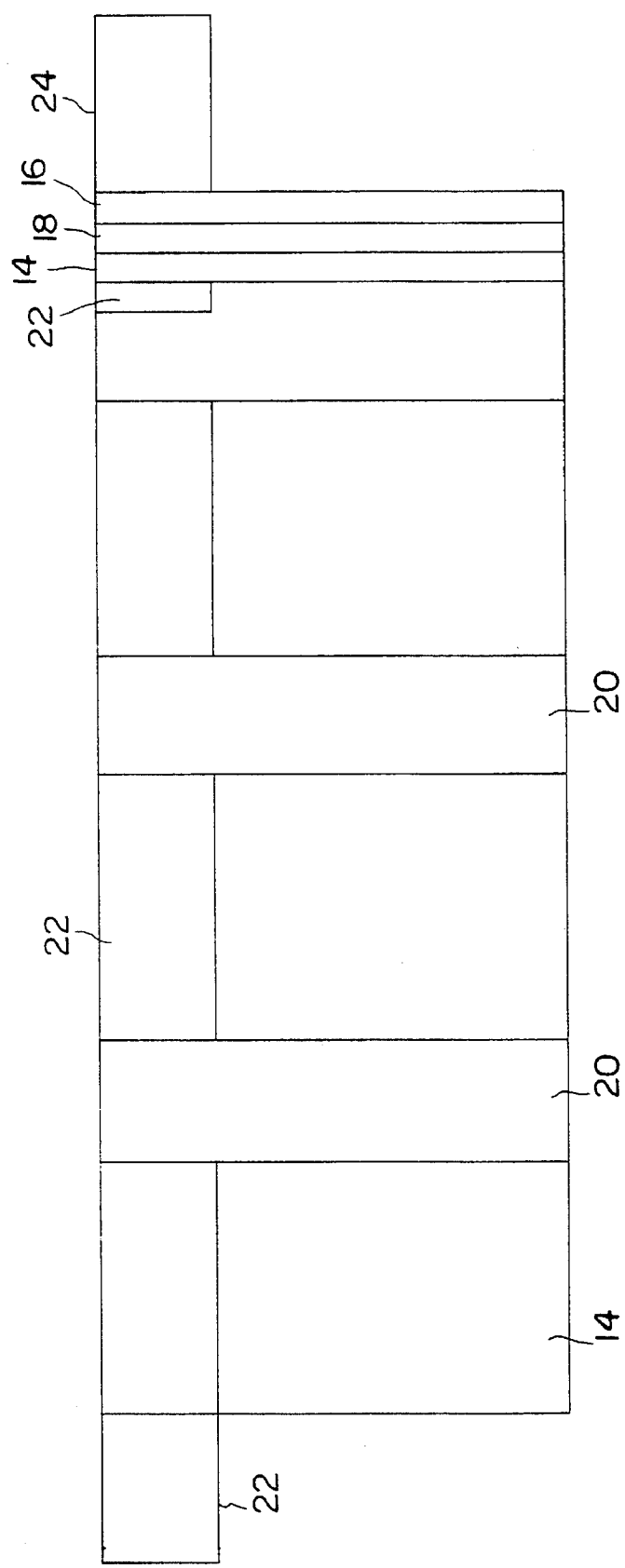
FIG. 2 is a side view of the battery electrode structure illustrated in FIG. 1.

The battery electrodes 10 in accordance with the subject invention preferably comprise nickel, either in the form of a foraminate, e.g., wire mesh structure, sintered metal fibers, or nickel powder which has been impregnated into a porous metal base structure, such as sintered stainless steel metal fibers or stainless steel wire mesh, and then sintered in place. As is well known in the art, a battery electrode typically comprises an active material and an electrode substrate or structure.

In any of the forms described above, the foraminate structure, prior to use as a battery electrode, is in pleated form, preferably by corrugation, as described below, to obtain the requisite high surface area, high geometric voids volume, and structural rigidity.

Typically, the porous metal structures from which the pleated electrodes are formed will have thicknesses in the range of from about 0.002 to about 0.020 inches, more preferably from about 0.005 inches to about 0.010 inches. The structures have pleats with a pleat height typically of from about 0.030 to about 0.375 inches, preferably from about 0.100 to 0.130 inches with the pleat pitch (number of pleats per inch) typically in the range of from about 2 to about 100, preferably from about 2 to 30 pleats per inch, more preferably from about 15 to 25 pleats per inch, most preferably about 20 pleats per inch.

The pleats of the structures in accordance with this invention may be formed by conventional means, most preferably by corrugation although other methods such as pressing, rolling, or the like may also be used. The pleats may take various forms. For example, they may be parallel in a generally sheet-like form (see FIG. 1). Alternatively, the electrode structure may be generally circular in form with fan-shaped pleats. In another embodiment, they may be formed into cylinders, spirals, or the like. Further, the pleats may themselves be pleated either parallel to the priming pleats or across the primary pleats. The pleats may be curved, tapered, or discontinuous, as well as varying in height over their length.

When a metal powder, such as nickel, is sintered to a base substrate, e.g., sintered stainless steel metal fibers or a wire mesh, the technique disclosed in U.S. Pat. No. 4,562,039, which is incorporated herein by reference, is preferably employed. Basically, the process described in that patent calls for forming a stabilized suspension of the dispersed metal particulate, e.g., nickel, in a fluid medium and applying that stabilized suspension to a foraminate substrate or support of, for example, a woven wire mesh or sintered stainless steel metal fibers, working the support to fill the openings with the stabilized suspension of the metal powder, heating the filled support to dry the stabilized suspension, preferably compressing the dried, filled support to provide better contact between adjacent particles, and sintering the compressed, dried, filled support to remove volatile material and diffuse the individual metal particles to the metal support and to each other. As discussed above, in the alternative, the basic foraminate structure 12 when made of the appropriate material, e.g., nickel or sintered metal fibers, may itself be corrugated and used to form the battery electrode.

As an alternative embodiment of the subject invention, a cathode 14 anode combination structure can be formed with a separator interleaf 18 by forming the anode and cathode of the appropriate foraminate structure and pleating the anode/separator interleaf and cathode together in the manner described above. A typical separator interleaf that may be used in this manner is described in U.S. Pat. No. 4,339,473 which is incorporated herein by reference.

The subject invention may be used with a variety of secondary batteries, including nickel/cadmium, nickel/zinc, nickel/silver, and nickel/iron.

The subject invention will be understood by reference to the following example which is given by way of illustration and not by way of limitation.

A correlated electrode 10, as illustrated in FIG. 1 comprising stainless steel wire mesh and nickel powder was made by the following steps:

1. A stainless steel woven wire mesh with a mesh count of 84 wires per inch by 84 wires per inch with a wire diameter of 0.0035 inches was compressed (calendared) to a thickness of 0.005+0.0002 inches.

2. The compressed woven wire mesh was then impregnated with fine nickel powder in a stabilized suspension with nominal nickel powder particle diameters of approximately 8 microns. The impregnation process used was the same as that taught in U.S. Pat. No. 4,562,039. Specifically, a stabilized suspension of the dispersed metal particulate, nickel powder, in a fluid medium was formed by mixing 26.6 parts by weight water, 30 parts by weight of the nickel powder, and 0.269 parts by weight Carbopol 934 (a polyacrylic acid available from B.F. Goodrich Chemicals Company, a molecular weight of 3,000,000), and the stabilized suspension was applied to a foraminate substrate or support of, in this example, a stainless steel woven wire mesh. The support was then worked to fill the openings with the stabilized suspension of the metal powder.

3. After impregnation, the structure was then dried and calendared to a final thickness of 0.007±0.0002 inches thick.

4. The dried structure was then sintered twice at 2050° F. in a pure, dry hydrogen atmosphere without the use of setters.

5. After sintering, the structure was corrugated to a pleat height of 0.120 inches with a pitch of 20 pleats per inch.

The corrugated structure 12 exhibited a geometric voids volume of 90% and a BET surface areas of 0.028 square meters per gram. Translating into area, the BET surface area per unit area of the corrugated electrode is 66.4 square meters of surface area per nominal 1 square meter of the corrugated electrode.

Other variations are contemplated including:

1. Inserting conductive and/or non-conductive support and drainage spacers 20 or supports in-between the pleats to further stiffen and rigidify the structure and/or to enhance electrical conductivity properties.

2. Variable pleat pitch per electrode to minimize electrical resistance losses along the length of the electrode and minimize the heat of charge/discharge, e.g., when electrical buss hardware is attached to the top of electrode with the pleats running horizontally, the pleat pitch at the upper portion of the electrode may be higher than in the lower portion.

3. Incorporation of solid metal strips 22 and 24 by attaching to the structure, preferably along one or more edges of the structure, prior to sintering or subsequent to sintering and the formation of the pleats in the completed electrode to provide additional stiffness and electrical conductivity. The solid metal strip would also facilitate attachment of electrical buss hardware with minimal electrical resistance.

4. Coining one or more edges of the pleated electrode to stiffen and provide a method to attach the electrode to solid electrical buss hardware by itself or in combination with 1., 2., or 3. above.

Although the present invention has been described in terms of specific exemplary embodiments, it is not limited to those embodiments. Alternative embodiments and modifications which would still be encompassed by the invention may be made by those skilled in the art, particularly in light of the foregoing teachings. Therefore, the following claims are intended to cover any alternative embodiments, modifications, or equivalents which may be included within the spirit and scope of the invention as defined by the claims.

We claim:

1. An apparatus for use in a battery, the apparatus comprising an anode and a cathode, wherein at least one of the anode and the cathode includes a porous, pleated, metal structure including sintered metal particulates.

2. The apparatus of claim 1 wherein the metal structure comprises nickel.

3. The apparatus of claim 2 wherein the sintered metal particulates comprise sintered nickel metal fibers.

4. The apparatus of claim 3 wherein the nickel metal fibers are sintered to each other and to a wire mesh.

5. The apparatus of claim 2 wherein the sintered metal particulates comprise stainless steel metal fibers impregnated with nickel powder.

6. The apparatus of claim 1 including a pleat pitch in the range of from 2 to 100 pleats per inch.

7. The apparatus of claim 5 wherein the pleats are of a pleat height of about 0.030 to about 0.375 inches.

8. The apparatus of claim 6 wherein the pleat pitch is in the range of from about 15 to about 25 pleats per inch.

9. The apparatus of claim 8 wherein the pleats are of a pleat height of about 0.100 to about 0.130 inches.

10. The apparatus of claim 6 wherein the pleat pitch is in the range of from about 2 to about 30 pleats per inch.

11. The apparatus of claim 10 wherein the pleats are of a pleat height of about 0.100 to about 0.130 inches.

12. The apparatus of claim 1 wherein the number of pleats varies along the electrode.

13. The apparatus of claim 1 wherein the pleats include conductive drainage spacers and supports in-between the pleats.

14. The apparatus of claim 1 wherein the pleats are of a pleat height of about 0.030 to 0.375 inches.

15. The apparatus of claim 1 wherein the porous, pleated, metal structure includes a solid metal strip along at least one edge of the structure.

16. The apparatus of claim 1 wherein at least one of the edges of the structure is coined.

17. The apparatus of claim 1 wherein the porous, pleated, metal structure including sintered metal particulates is a pleated substrate.

18. The apparatus of claim 1 wherein the porous, pleated, metal structure is a corrugated, metal structure including nickel metal powder sintered to a stainless steel wire mesh and wherein the corrugations provide pleats of a pleat height from about 0.100 to about 0.130 inches and a pleat pitch of from about 15 to about 25 pleats per inch.

19. An apparatus for use in a battery, the apparatus comprising an anode and a cathode, wherein at least one of the anode and the cathode includes sintered metal particulates and is a porous, pleated, metal substrate structure.

20. The apparatus of claim 19 wherein the porous, pleated, metal substrate structure has a surface area of at least about 0.02 square meters per gram.

21. The apparatus as recited in claim 20 wherein the surface area ranges from about 0.25 to about 0.040 square meters per gram.

22. The apparatus of claim 19 wherein the porous pleated metal substrate structure includes a wire mesh.

23. The apparatus of claim 22 wherein the porous, pleated, metal substrate structure includes nickel metal powder sintered to a stainless steel wire mesh.

24. The apparatus of claim 22 wherein the porous, pleated, metal substrate structure includes a nickel wire mesh.

25. An apparatus for use in a battery, the apparatus comprising first and second porous metal electrode layers and a separator interleaf disposed between the first and second porous metal electrode layers wherein the first and second porous metal electrode layers and the separator interleaf are pleated together.

26. The apparatus of claim 25 wherein the first and second porous metal electrode layers are formed from sintered metal particulates.

27. A battery electrode comprising a porous, pleated, metal battery electrode substrate formed from sintered metal particulates and an active material.

28. The battery electrode of claim 27 wherein the metal electrode substrate comprises nickel.

29. The battery electrode of claim 28 wherein the sintered metal particulates comprise stainless steel metal fibers impregnated with nickel powder.

30. The battery electrode of claim 28 wherein the metal electrode substrate includes a nickel wire mesh.

31. The battery electrode of claim 28 wherein the sintered metal particulates comprise sintered nickel metal fibers.

32. The battery electrode of claim 31 wherein the nickel metal fibers are sintered to each other and to a wire mesh.

33. The battery electrode of claim 27 wherein the metal electrode substrate includes nickel metal powder sintered to a stainless steel wire mesh.

34. A battery electrode substrate comprising a porous, pleated, metal structure formed from sintered metal particulates wherein the number of pleats varies along the electrode substrate.

35. A battery electrode substrate comprising a porous, pleated, metal structure formed from sintered metal particulates wherein the pleats include conductive drainage spacers and supports in-between the pleats.

36. A battery electrode substrate comprising a porous, pleated, metal structure formed from sintered metal particulates wherein the porous, pleated, metal structure includes a solid metal strip along an edge of the structure.

37. A battery electrode substrate comprising a porous, pleated, metal structure formed from sintered metal particulates wherein at least one of the edges of the structure is coined.

38. The battery electrode of claim 27 including a wire mesh.

39. A method for manufacturing a battery electrode substrate comprising:

sintering metal particulates;

pleating the metal particulates to form a porous, pleated, metal Structure; and configuring the porous, pleated, metal structure as an electrode in a battery.

40. A method for using a porous, pleated, sintered metal structure formed from sintered metal particulates comprising utilizing the porous, pleated, sintered metal structure as a substrate for an electrode in a battery.

\* \* \* \* \*